United States Patent
Taisne

[11] 3,809,895
[45] May 7, 1974

[54] SYSTEMS FOR MEASURING DISPLACEMENTS

[76] Inventor: Jean Taisne, 81 Residence Delphine, 94120 Fontenay-sous-Boise, France

[22] Filed: Oct. 5, 1972

[21] Appl. No.: 295,126

[30] Foreign Application Priority Data
Oct. 13, 1971 France .................... 71.36756

[52] U.S. Cl. .................... 250/237 G, 356/169
[51] Int. Cl. .................... H01j 3/14
[58] Field of Search .......... 250/231 R, 231 SE, 237, 250/205, 214, 219 D; 356/167, 169, 170

[56] References Cited
UNITED STATES PATENTS

| | | | |
|---|---|---|---|
| 3,566,140 | 2/1971 | Granquist | 250/231 |
| 3,525,094 | 8/1970 | Leonard | 250/231 SE |
| 3,214,593 | 10/1965 | Killpatrick | 250/205 |
| 3,525,856 | 8/1970 | Mengert | 250/205 |
| 3,469,101 | 9/1969 | Rabian | 250/205 |

*Primary Examiner*—Archie R. Borchelt
*Assistant Examiner*—D. C. Nelms
*Attorney, Agent, or Firm*—Cameron, Kerkam, Sutton, Stowell & Stowell

[57] ABSTRACT

A displacement measuring system has an energy source, a displacement sensor including spaced energy detectors and a measuring scale between the source and the sensors movable with respect to the sensors. The detectors provide phase displaced undulatory signals from movement of the scale. The energy provided by the source is controlled by comparing with a reference signal a continuous energy signal attained by linearly combining the measuring signals provided by the detectors. The energy signal has at all times a level substantially equal to the mean amplitude of the measuring signals.

7 Claims, 10 Drawing Figures

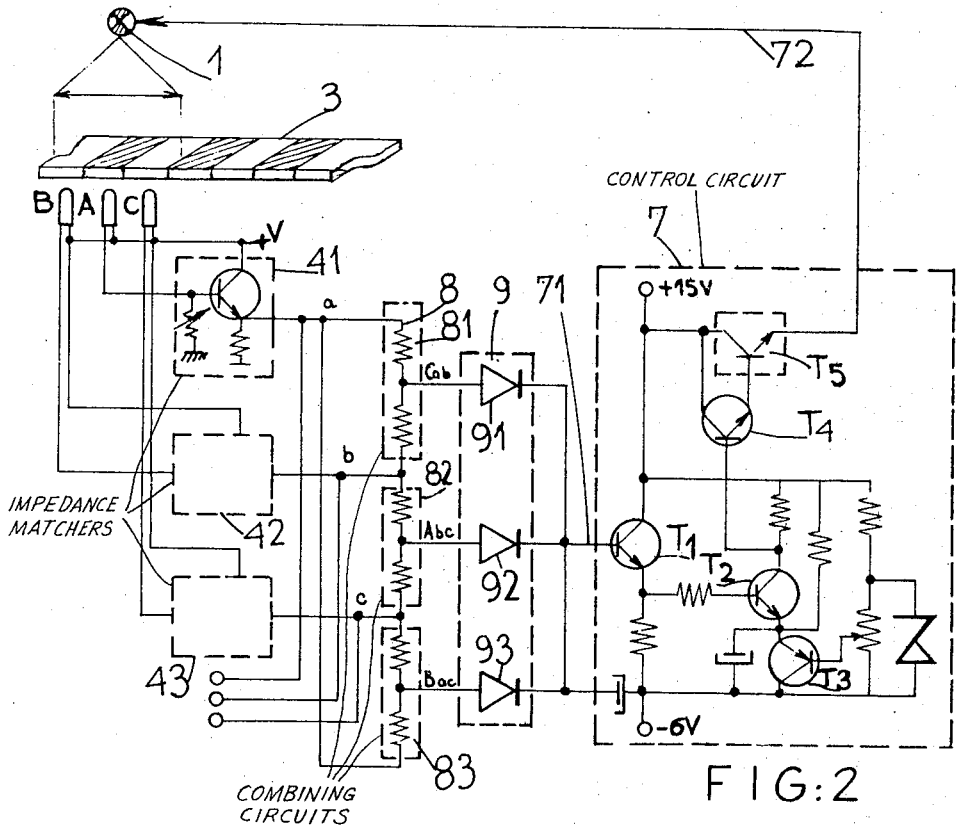
FIG:2
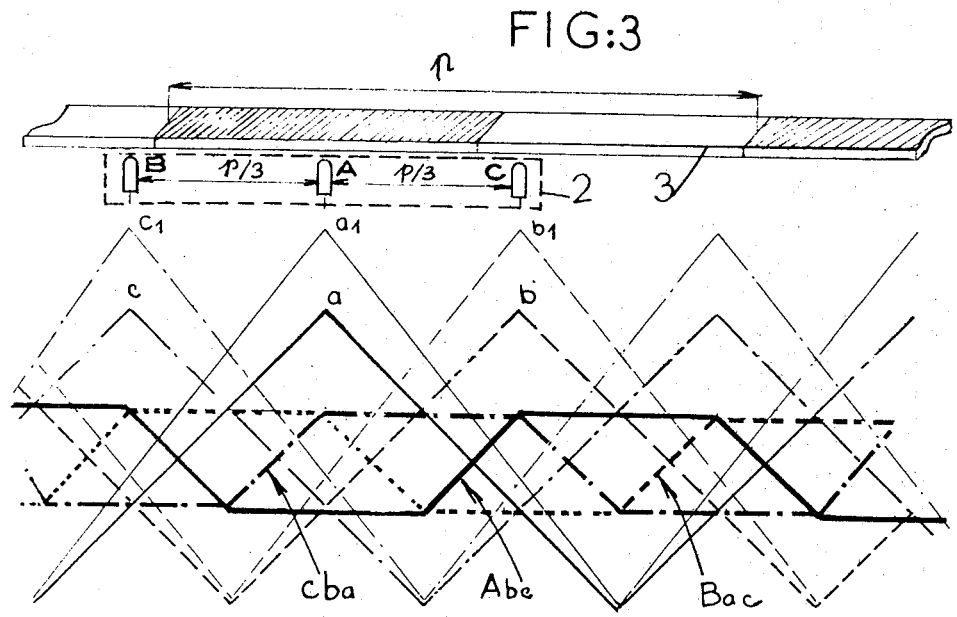
FIG:3

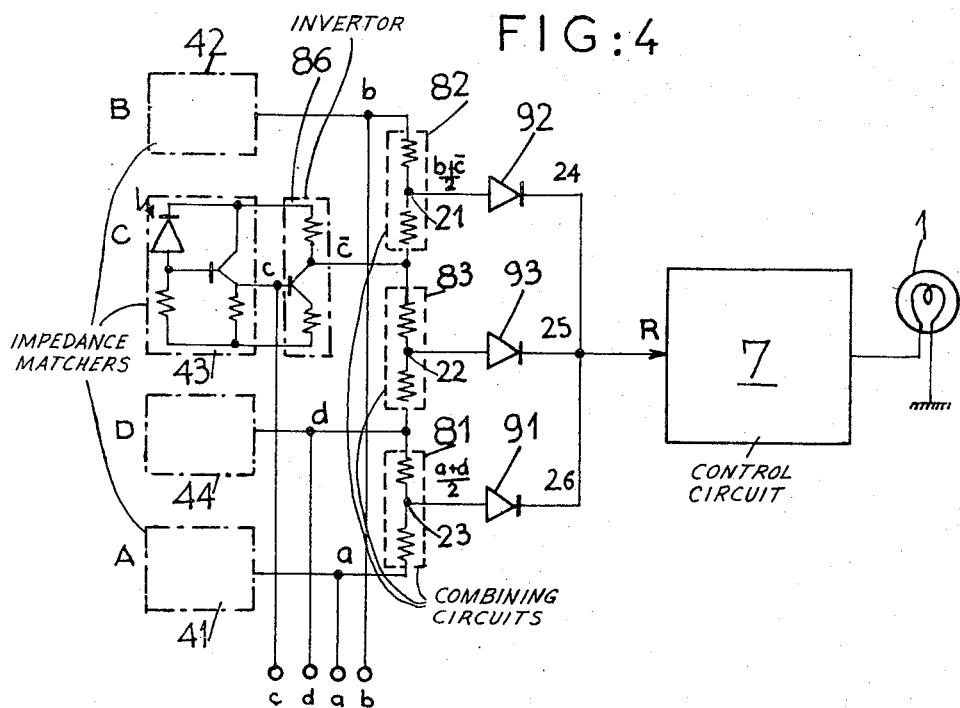
FIG: 4
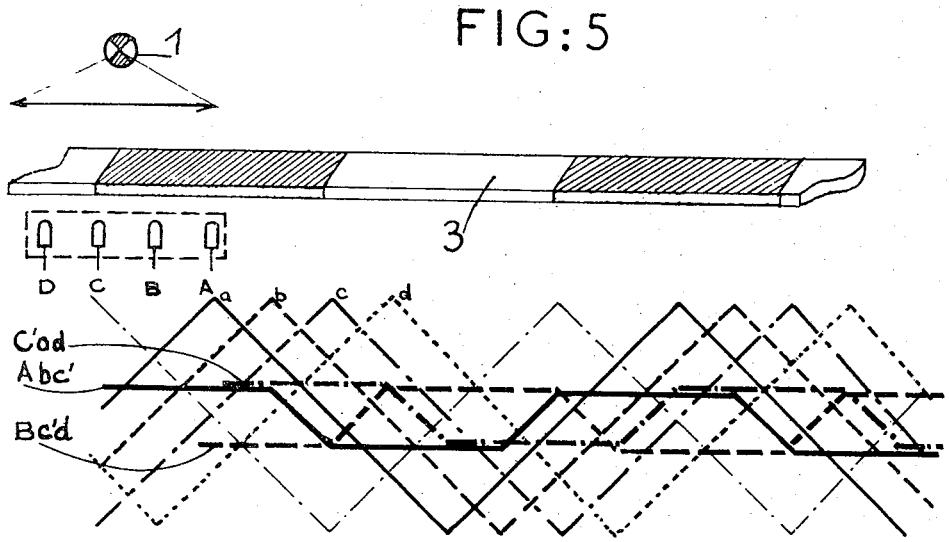
FIG: 5

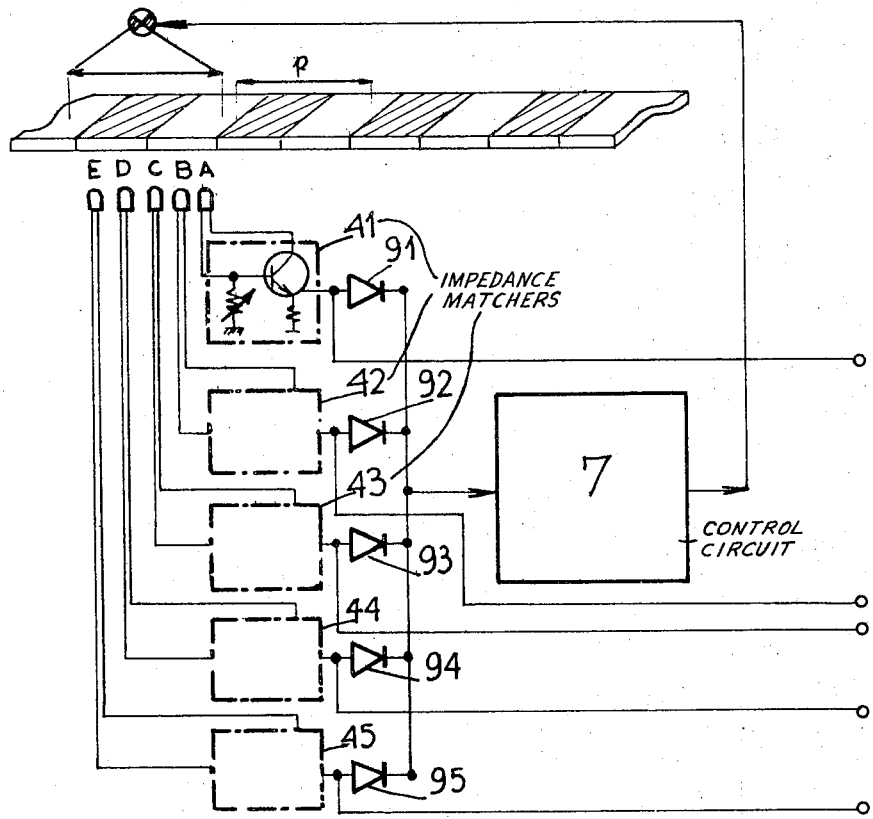
FIG:6
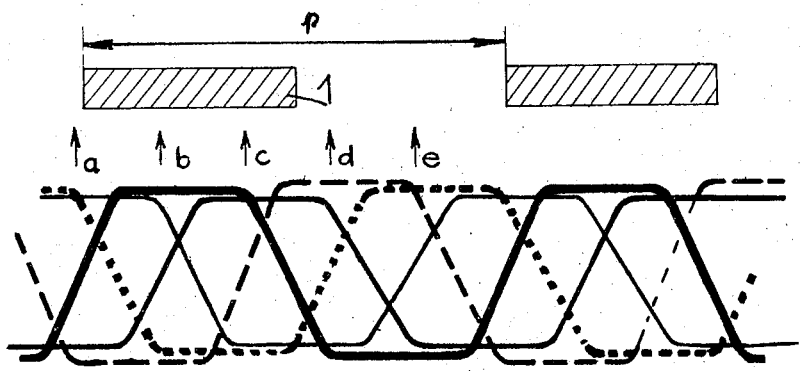
FIG:7

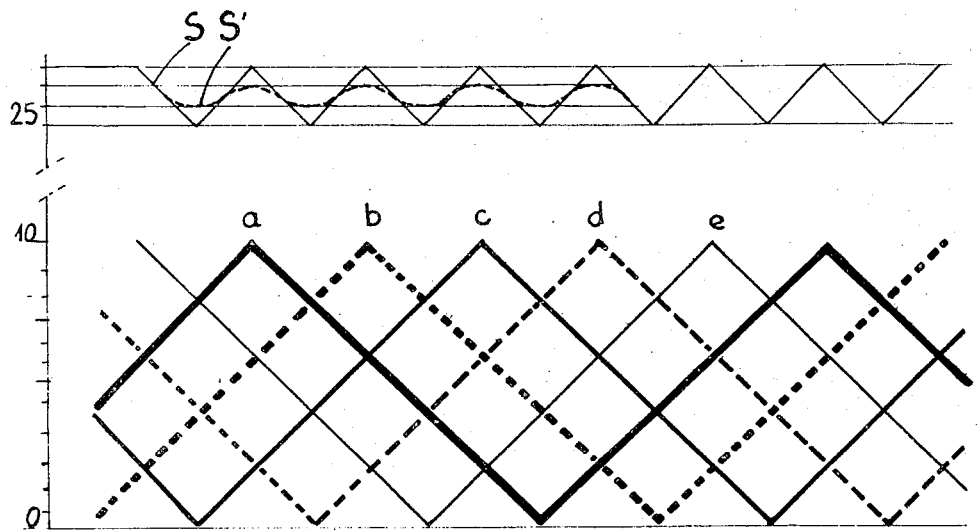
FIG:8
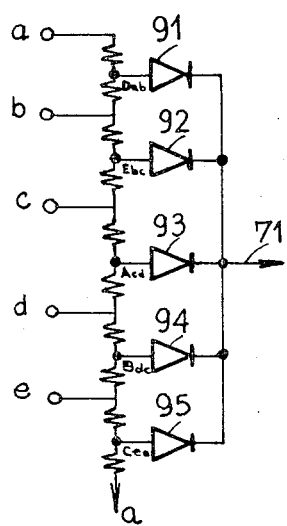
FIG:9
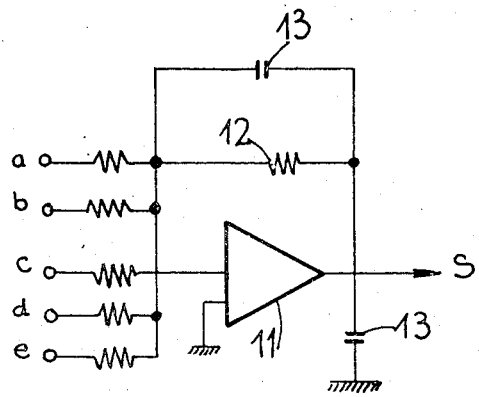
FIG:10

SYSTEMS FOR MEASURING DISPLACEMENTS

This invention relates to improvements in displacement-measuring systems. Although not limited to this particular application, the invention has particular application to systems for measuring the displacement of a member movable with respect to another, such as is used for example in machine tools for controlling the movement and the position of a member carrying a tool or workpiece. Known systems of this kind include a source of energy, a displacement sensor comprising a plurality of detectors sensitive to the energy from the source and a measuring scale interposed between the energy source and the sensor, which latter is immovable with respect to the source. In fact, the scale is rigidly coupled to one member and the sensor and source to the other member. When the members are mutually displaced, the detectors yield undulatory phase-displaced signals as the sensor passes along the scale. The measuring scale is usually composed of a series of equal marks and spaces of different effect upon energy passing from the source to the detectors. For example, if photoelectrically sensitive detectors are used with a light source, the marks may be opaque and the spaces transparent. The undulatory signals thus have a trapezoidal waveform, composed of high level portions corresponding to the passage of the energy through the transparent spaces, low level portions corresponding to the presence of the opaque marks and rising and falling flanks corresponding to movement from a mark to a space, or vice versa.

According to the construction of the apparatus the length of the high- and low-level portions may be variable and may even be zero, the signal then having substantially a sawtooth waveform.

In known displacement measuring systems the phase-shifted undulatory signals which are thus obtained are afterwards re-shaped in such a manner as to give them vertical flanks, then combined together in known apparatus of various kinds which permit a certain number of increments to be distinguished within one division of the scale, the number of such increments depending upon the number of detectors, upon their disposition and upon the coding which is used, each displacement by one increment giving rise to the production of one impulse.

To determine precisely the change in level in the output signal from a detector it is apparent that it is necessary to give the undulatory signals a rectangular form such that the inclined flanks of the initial signal become vertical. This reshaping is usually effected by comparison of the undulatory signal with a constant-level reference signal. The energy source does not always supply a constant amount of energy, so that the variations of radiated energy may give rise to a change in the level of the measuring signals, and similar changes in the re-shaped signals. As a result, the instant at which an inclined signal flank intersects the reference level, that is, the instant at which the level of the undulatory signal passes upwardly or downwardly through the reference level, may change if the form of the undulatory signal alters. The position of the impulse may thus change and the measurement will be distorted by errors.

For this reason the known systems often include an arrangement for controlling the energy radiated from the source, which compares a signal denotive of the energy radiated at each instant with an absolutely constant reference level. The energy-denotive signal is generally provided by a detector placed beside the sensor, but spaced from the graduated scale, which thus supplies a signal denotive of the maximum energy received by the detectors of the sensor. In order to take into account the fact that the support for the scale may be dirty and may thus affect the energy transmitted to the detector, this auxiliary detector is generally placed on the other side of the scale support from the radiation source, but spaced from the graduated scale in such a manner as not to be affected by the marks and spaces of the graduated scale.

Such systems give general satisfaction but unfortunately it is not always possible to employ an auxiliary detector, often through lack of space, especially when reading is effected by reflection from a metallic scale. Additionally, it is in every way advantageous to reduce the number of detectors which must be used.

According to the present invention there is provided a displacement measuring system comprising an energy source, a displacement sensor including a plurality of mutually spaced energy detectors responsive to energy from the source, and a measuring scale interposed between the source and the sensor and movable with respect to the latter, the detectors yielding phase-displaced undulatory signals upon movement of the sensor with respect to the scale, the system also including an arrangement for controlling the energy provided by the source by comparing with a reference level a continuous energy-denotive signal obtained by linearly combining the measuring signals provided by some at least of the detectors and which has at all times a level substantially equal to the mean amplitude of the measuring signals.

It will be understood that the invention permits control of the energy emitted from the source without requiring the use of auxiliary detectors.

In a preferred embodiment of the invention the linear combination the measuring signals is composed of the means of at least some of the measuring signals taken two at a time, the energy-denotive signal being composed of an envelope of the actual signals representing the said means.

Preferred features and advantages of embodiments of the invention will become apparent from the following description, taken in conjunction with the accompanying drawings, of which:

FIG. 2 is a schematic diagram illustrating an embodiment of a control arrangement in accordance with one embodiment of the invention for an apparatus using a three-element code;

FIG. 3 is a diagram illustrating the undulatory measurement signals developed by the detectors in the arrangement of FIG. 2;

FIG. 4 is a schematic diagram illustrating an embodiment of a control arrangement in accordance with another embodiment of the invention for an apparatus using a four-element code;

FIG. 5 is a diagram illustrating the undulatory measurement signals developed in the apparatus of FIG. 4;

FIG. 6 is a schematic diagram illustrating a third embodiment of a control arrangement for an apparatus using a five-element code;

FIG. 7 is a diagram representing the undulatory measurement signals developed in the apparatus of FIG. 6;

FIG. 8 is a diagram representing another form of undulatory signals developed in the apparatus of FIG. 6;

FIG. 9 is a circuit diagram of apparatus for developing control signals from the measurement signals of FIG. 8; and FIG. 10 is a circuit diagram of another form of apparatus for developing control signals from the measurement signals of FIG. 8.

FIG. 1 illustrates schematically a displacement measuring system of known kind such as is used for the automatic control of machine tools.

Figure 1:
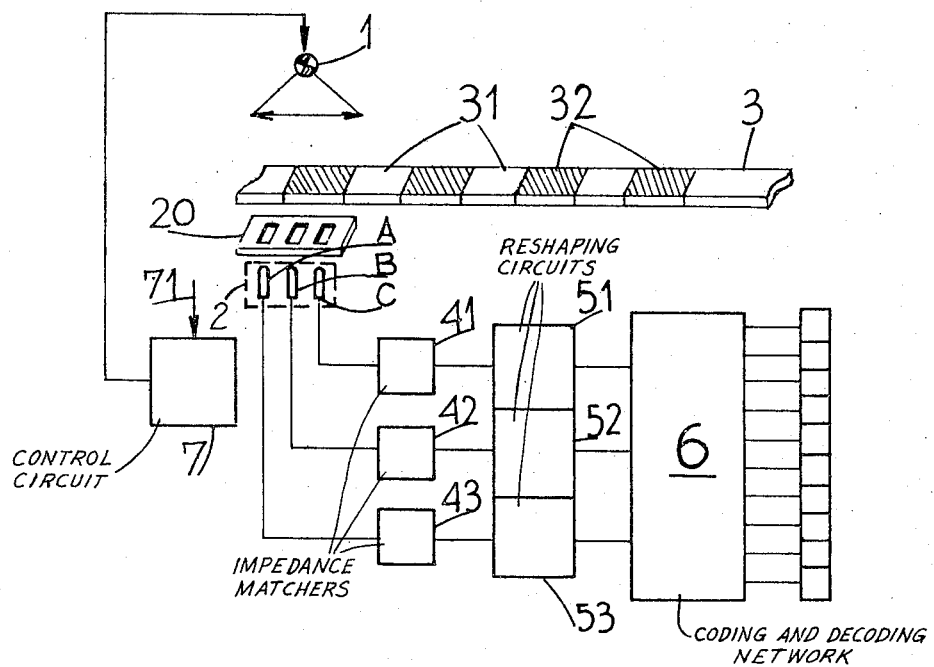
FIG. 1 is a schematic representation of a displacement measuring system in accordance with the invention.

The system illustrated includes a source 1 of radiant energy and a sensor 2 composed of a plurality of detectors A, B, C sensitive to the radiated energy. A measuring scale 3 interposed between the source 1 and the sensor 2 is composed of a succession of marks separated by spaces, the marks and spaces varying differently the energy received by the detectors as the sensor is displaced with respect to the scale.

Thus in the case of a machine tool the scale may be fixed on the base of the machine. The sensor and the energy source would then be fixed on the machine carriage so as to respond to its displacement with respect to the base.

The energy source 1 may be a light source provided with a condensing system producing a parallel bundle of light rays, the detectors of the sensor being photodiodes. If the scale is composed of a series of transparent marks 31 separated by opaque spaces 32, then as the detectors are displaced with respect to the scale each will yield a more or less trapezoidal undulatory signal, composed of alternating horizontal portions of high and of low level, corresponding to the passage of the detector in front of a mark or a space, connected by rising or falling flanks corresponding to passage from a space to a mark and vice versa. Between the scale and the detectors is placed a grating 20 provided with slots corresponding to the respective detectors and of which the slot width controls the slope of the rising and falling flanks and the lengths of the horizontal portions.

It is thus possible to develope trapezoidal undulatory signals as illustrated in FIG. 7, or sawtooth signals as in FIGS. 3, 5 and 8, which latter, however, represent the theoretical signals, the points of the sawteeth being in practice somewhat rounded off.

As illustrated in FIGS. 3, 4, 7 and 8, the signals developed by the detectors are mutually displaced in phase by an amount corresponding to the spacing between the detectors, ignoring any multiples of the scale graduation length, since the detectors are not necessarily placed in front of a single mark or space. On the other hand the electrical signals arising directly at the outputs of the detectors are transformed into measuring signals by the impedance matchers 41, 42, 43, each composed, as indicated in FIG. 2, of a transistor and a fixed and a variable resistor, the latter permitting the measurement signals to be adjusted to exactly the same amplitude for the same energy provided by the source 1.

In known displacement measuring systems such as that represented in FIG. 1 the measuring signals are first of all transformed into signals of rectangular waveform by comparison with a reference level, in reshaping circuits 51, 52, 53, then combined together in a coding and decoding network 6 supplying either coded information representative of the position of the sensor with respect to the scale or an impulse for each displacement of the sensor by one increment, the latter impulses being recorded in a counter, the number of impulses developed for each gradation of the scale being dependent upon the number of detectors, their relative positions and the manner in which the signals are combined and employed.

It has been noted that it is necessary to effect control of the energy radiated by the source to be certain of obtaining measurement signals of constant amplitude.

To this end a control arrangement 7, of known type, receives a signal 71 denotive of the energy passing through the scale which it compares with a signal of constant level to develop a signal 72 acting on the source 1 so as to correct immediately the variations of the detected energy with respect to the reference signal.

It should be noted that the signal 71 must be denotive of the mean energy received at each instant by the detectors and must not depend upon the marks and spaces. In the known arrangements the energy-denotive signal is supplied by an auxiliary detector placed behind the scale support member but spaced from the graduated part thereof.

The present invention, which will now be described, permits the use of a supplementary detector to be avoided, the signal denotive of the source energy being obtained from the measuring signals supplied by the detectors of the displacement sensor.

In the first embodiment of the invention, illustrated by FIGS. 2 and 3, the example is considered of a sensor having three detectors A, B, C, giving respective sawtooth measuring signals $a$, $b$ and $c$. These signals are combined two at a time in circuits 81, 82 and 83, constituted by identical resistors, which form the mean of each signal pair:

$$A_{bc} = b + c/2; \; B_{ca} = c + a/2; \; C_{ab} = a + b/2.$$

The mean signals thus obtained include high and low horizontal portions of length equal to the spacing between two detectors, these horizontal portions thus representing prolongations of one another. In consequence, if the diodes 91, 92, 93 allow only the signal of maximum or of minimum level to pass, a continuous signal ($A_{bc}$, $B_{ac}$, $C_{ab}$) is obtained, the level of which remains constant if the energy radiated does not vary, and which under all conditions represents the mean value of the energy received by the detectors. It will be seen from the graph that if the energy increases by an amount $e$, the signals $a$, $b$, $c$ become $a_1$, $b_1$, $c_1$, and the signal representing the maximum value of ($A_{bc}$, $B_{ac}$, $C_{ab}$) increases by the same amount $e$ and thus remains denotive of the energy received by the detectors.

The signal 71 is applied to the input of the control device 7 which may be of any known type, such as that of which details are shown in FIG. 2. As will be seen, this device consists essentially of:

An impedance-matching transistor $T_1$, providing at its emitter the signal Max ($A_{bc}$ $B_{ac}$ $C_{ab}$) denotive of the energy radiated by the source, and A transistor $T_2$ arranged to compare the energy denotive signal with an exactly constant standard potential supplied at the emitter of a transistor $T_3$.

Any difference between the compared potentials produces a change in the base current of transistor $T_4$ and thus also in the base current of a transistor $T_5$ which controls the current passing through the source 1.

There is thus obtained at the output of device 7 a signal 72 recording the variations of the signal 71 above or below the reference level and producing the immediate correction of the level of energy radiated by the source.

In the embodiment which is about to be described the detectors were evenly spaced along one gradation of the scale, their spacing being one-third $p$, where $p$ is the length of one scale gradation, but the energy-denotive signal may be of a similar nature even if the detectors are not spaced along one gradation of the scale.

This is the case, for example, which is illustrated by FIGS. 4 and 5, where it is seen that the four detectors A, B, C and D are grouped along a distance which is equal to one half of a scale gradation, that is to one mark or one space. This arrangement is advantageous because it allows eight increments to be distinguished within one scale gradation. It is apparent, however, that if the means of pairs of the measuring signals $a$, $b$, $c$ and $d$ provided by the detectors are formed, the signal constituted by the high and low horizontal portions will not be continuous. In this case one of the signals, for example $c$, is inverted to obtain the complementary signal $c' = -/c/$ and the means are formed as follows: $A_{bc} = b + c'/2$; $B_{cd} = c' + d/2$; $C'_{ad} = a + d/2$.

It is immediately seen from FIG. 5 that the signal Max ($A_{bc'}$ ; $B_{c'}$ $_d$; $C'_{ad}$) constituted by the upper horizontal portions of the three means $A_{bc'}$, $B_{c'}$ $_d$ and $C'_{ad}$ is a continuous signal denotive of the mean level of radiant energy received by the detectors, the upper horizontal portion of the signal $C'_{ad}$ forming an extension of the upper horizontal limbs of the signals $A_{bc'}$ and $B_{c'}$ $_d$.

It should be noted that although the sensor includes four detectors, three mean signals are sufficient to form the energy-denotive signal 71, and that as a result the diagram of FIG. 4 is similar to that of FIG. 2, it being sufficient to add an inverter 86 which forms the signal $C'$, the complement of the signal C. In addition, in FIG. 4, the detectors A, B, C, D are shown schematically as being photo-diodes.

It will be understood that the detector signals may be combined in other manners than by forming the mean values of the signals taken two at a time, what is necessary is to form linear combination in which all the signals used are employed in the same manner.

Moreover, these combinations may be still more simple, especially when the sensor includes a higher number of detectors.

In the embodiment illustrated by FIGS. 6 and 7, the sensor includes five detectors A, B, C, D and E, equally spaced along one gradation $p$ of the scale. It has been seen that a grating (20 in FIG. 1) allows the slope of the rising and falling flanks of the measuring signal $s$ to be adjusted, and as a result the lengths of the upper and lower horizontal portions of the signal. It is thus possible for these horizontal portions to overlap one another, as shown in FIG. 7. In this case it is only necessary to select the maximum levels attained by the measuring signal, by means of diodes 91, 92, 93, 94 and 95 (FIG. 6), for example, in order to obtain a continuous signal denotive of the energy received by the detectors.

It is thus seen that in this arrangement the signal denotive of the source energy may be formed by extremely simple means consisting merely of five diodes.

For various reasons, however, it is preferred to employ measuring signals not including horizontal portions, as shown in FIG. 8.

The detectors A, B, C, D and E are arranged as in FIG. 7 and by suitable choice of an associated grating are arranged to yield the sawtooth signals $a$, $b$, $c$, $d$ and $e$. It is apparent that the energy-denotive signal may be obtained by appropriately associating the means of the signals taken two at a time, as indicated above. Thus it is possible to form the signals:

$A_{cd} = c + d'/2$, $B_{de} = d + e'/2$, $C_{ea} = e + a'/2$, $D_{ab} = a + b'/2$ and $E_{bc} = b + c/2$ Identical resistors may be used to form the mean signals and diodes as diodes 91, 92, 93, 94 and 95 may be used to select the signal of maximum level, as shown in FIG. 9, the energy-denotive signal 71 being equal to Max ($A_{cd'}$ $B_{de'}$ $C_{ea'}$ $D_{ab'}$ $E_{bc}$).

Other possibilities will be apparent from examination of the measuring signals represented in FIG. 8.

It should be noted that if the measuring signals $a$, $b$, $c$, $d$ and $e$ have, for example, an amplitude of 10 units, the signal S produced by forming the sum of all the signals ($S = a + b + c + d + e$) is an undulatory signal having a period representative of the spacing between the detectors and the amplitude of which will not exceed three units. Note that the curves shown in FIG. 8 are obviously ideal curves, practical curves will have their peaks rounded-off, as indicated by broken line $S'$ in FIG. 8, which represents the practical signal formed from the sum $a + b + c + d + e$, the amplitude of which does not exceed unity. This amplitude is negligible with respect to that of the measuring signals themselves, so that the signal $S'$ may be used as the energy-denotive signal for controlling the light source.

The arrangement used in this case may be very simple. One embodiment is represented in FIG. 10. The lines on which the signals $a$, $b$, $c$, $d$ and $e$ appear are connected through identical resistors to a common line which in turn is connected to the line on which the signal S appears through an operational amplifier 11 having a resistive feedback path by way of a resistor 12, which is shunted by a capacitor 13 to provide smoothing of the applied signal. A further smoothing capacitor 13' shunts the amplifier output to ground. The sum signal S obtained at the amplifier output thus has a practically constant level, especially when the displacement being measured takes place at relatively high speeds.

The invention is not limited to the details of the various embodiments described, which are given only by way of example. The arrangements illustrated can be readily replaced by others which perform the same operations. Although certain signal combinations have been indicated as being particularly suitable, this will obviously depend upon the number of detectors and their disposition. It will be a simple matter for an expert to plot the theoretical phase-displaced signals obtained for a given energy level and to derive the appropriate combination of these signals to obtain a practically constant energy-denotive signal.

Although it has been proposed to take the means of the measuring signals taken two at a time, the signals may be combined in greater numbers and in other ratios. Also, although it has been described to take the maximum level of signal obtained, it would equally well be possible to employ the minimum level as the controlling quantity.

The invention is applicable to all kinds of displacement measuring systems, whatever the nature of the emitted energy, luminous, magnetic or other, and whether the scale is actual or virtual, i.e., formed by interference fringes.

The invention is in fact applicable wherever the signals from several detectors responsive to the energy of a single source are employed.

What we claim is:

1. A displacement measuring system comprising a radiation source, a displacement sensor including a plurality of mutually spaced radiation detectors responsive to radiation from the source, and a measuring scale interposed between the source and the sensor and movable with respect to the sensor, the detectors yielding undulatory measuring signals phased displaced with respect to each other upon movement of the sensor with respect to the scale, the system also including means for controlling the radiation provided by the source including means for comparing with a reference signal a continuous radiation signal, means for providing said signal by linearly combining the measuring signals provided by some at least of the detectors and said signal at all times having a level substantially equal to the mean amplitude of the measuring signals.

2. A system in accordance with claim 1, any residual undulatory component of said radiation signal having an amplitude less than the amplitude of the measuring signals.

3. A system in accordance with claim 1 wherein the linear combination of the measuring signals is constituted by the algebraic sum of at least some of the measuring signals added in pairs, the radiation signal being composed of the total of the signals representing the partial sums.

4. A system in accordance with claim 3 wherein the signals added in pairs and the signals of the algebraic sums are chosen such that at any time during the displacement to be sensed each sum will have a substantially zero derivative and the juxtaposition of the zero derivatives constitutes a continuous signal.

5. A system in accordance with claim 2 wherein the linear combination of the measuring signal is proportional to the sum of all the measuring signals.

6. A system in accordance with claim 1 wherein each measuring signal has a substantially trapezoidal undulatory waveform, presenting a succession of upper and lower peaks of constant level with intervening rising and falling edges, the distribution of the detectors along the scale being such that the constant levels of the different signals follow one another in a continuous manner, wherein the radiation signal is proportional to the measuring signal having at any instant the maximum or minimum level.

7. In a method for displacement measuring in a system having an energy source, a displacement sensor including a plurality of mutually spaced energy detectors responsive to energy from the source, a measuring scale interposed between the source and the sensor and movable with respect to the sensor, the detectors providing mutually phase-displaced undulatory measuring signals upon movement of the sensor with respect to the scale, the steps of forming a continuous signal by linearly combining the measuring signals from the detectors having a level substantially equal to the mean amplitude of the measuring signals and then comparing this signal with a reference signal to control the energy provided by the source.

* * * * *

CERTIFICATE OF CORRECTION

Patent No. 3,809,895          Dated May 7, 1974

Inventor(s) Jean Taisne

It is certified that error appears in the above-identified patent and that said Letters Patent are hereby corrected as shown below:

ASSIGNEE

[73] Societe d'Optique, Precision, Electronique et Mecanique - SOPELEM

Paris, Republic of France

Signed and sealed this 12th day of November 1974.

(SEAL)
Attest:

McCOY M. GIBSON JR.          C. MARSHALL DANN
Attesting Officer            Commissioner of Patents